Figure 1:
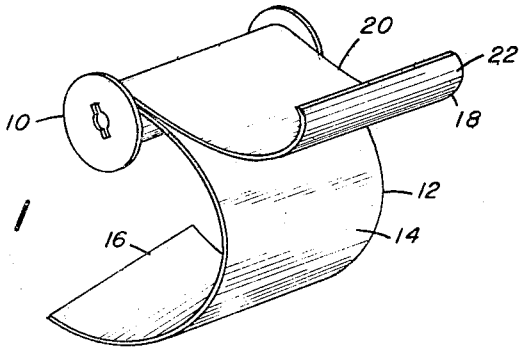
Figure 2:
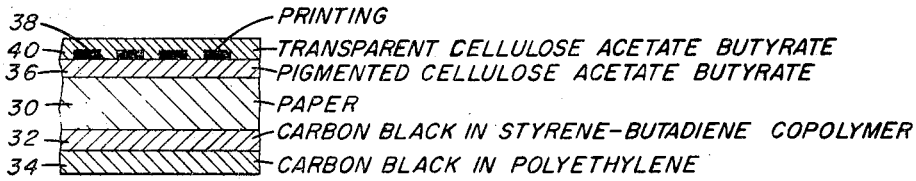
Figure 3:
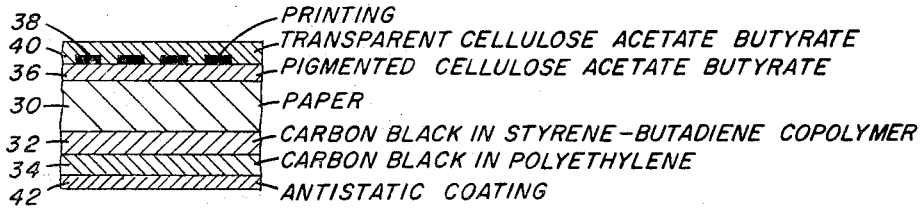
Figure 4:
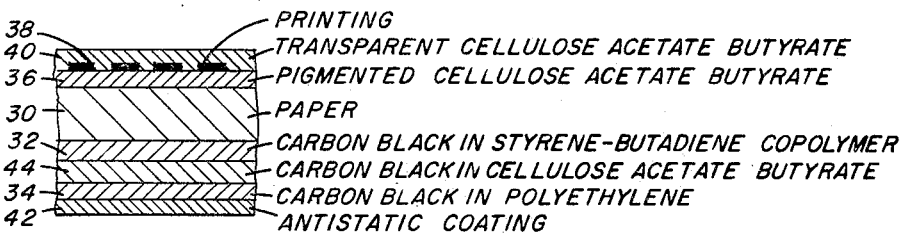

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 10, 1970

871 O.G. 353

T871,004

BACKING PAPER FOR PHOTOGRAPHIC ROLL FILM

William O. O'Neill, Rochester, and Edward E. Gartland, Penfield, N.Y. (both of 1669 Lake Ave., Rochester, N.Y. 14615)

Filed June 9, 1969, Ser. No. 831,377
Int. Cl. G03c *3/02;* B32b *29/00*
U.S. Cl. 117—14
1 Sheet Drawing. 9 Pages Specification

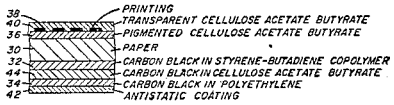

Backing paper for photographic roll film comprising a thin paper sheet coated on one side with a layer of carbon black in styrene-butadiene resin which is overcoated with a layer of carbon black in polyethylene resin and coated on its opposite side with pigmented and clear resin layers. An antistatic coating may be applied over the polyethylene layer and the layers of styrene-butadiene resin and polyethylene resin may be separated by a layer of carbon black in cellulose acetate butyrate. This combination of resin coatings provides a desirable combination of opacity, stiffness and low surface friction, while permitting the stringent limitations on overall thickness applicable to roll film backing papers to be maintained.

A specific example is a backing paper consisting of a supercalendered kraft paper with a thickness of 2.3 to 2.7 mils; on one side of the paper a 0.25 mil thick layer of cellulose acetate butyrate containing chrome yellow and titanium dioxide and a 0.1 mil thick transparent layer of cellulose acetate butyrate; and on the other side of the paper a 0.6 mil thick layer of carbon black in styrene-butadiene copolymer, a 0.05 mil thick layer of carbon black in cellulose acetate butyrate, a 0.6 mil thick layer of polyethylene containing carbon black and oleamide, and a 0.05 mil thick antistatic coating comprised of polyvinyl alcohol, potassium chloride and poly(methyl methacrylate) beads.

BACKING PAPER FOR PHOTOGRAPHIC ROLL FILM

Filed June 9, 1969

WILLIAM O. O'NEILL
EDWARD E. GARTLAND
INVENTORS

BY Alfred P. Lorenzo
Walter O. Hodsdon
ATTORNEYS